(12) United States Patent
Drescher et al.

(10) Patent No.: US 7,092,108 B2
(45) Date of Patent: Aug. 15, 2006

(54) METHOD FOR DETERMINING A POSITION AND POSITION MEASUREMENT DEVICE FOR CARRYING OUT THE METHOD

(75) Inventors: Jörg Drescher, Riedering (DE); Mathias Hausschmid, Palling (DE); Herbert Huber-Lenk, Nussdorf/Sondermoning (DE); Herbert Reiter, Garching/Alz (DE); Johann Streitwieser, Grabenstätt (DE); Wolfgang Holzapfel, Obing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 378 days.

(21) Appl. No.: 10/415,718

(22) PCT Filed: Oct. 13, 2001

(86) PCT No.: PCT/EP01/11860

§ 371 (c)(1),
(2), (4) Date: Sep. 8, 2003

(87) PCT Pub. No.: WO02/37059

PCT Pub. Date: May 10, 2002

(65) Prior Publication Data

US 2004/0026608 A1    Feb. 12, 2004

(30) Foreign Application Priority Data

Oct. 31, 2000    (DE) ............................. 100 54 075

(51) Int. Cl.
G01B 11/14 (2006.01)
G01D 5/34 (2006.01)

(52) U.S. Cl. ............ 356/616; 250/231.13; 250/231.14; 250/227.26

(58) Field of Classification Search ........ 356/614–623; 250/231.17, 231.14, 231.13, 231.16, 237 G; 702/150; 708/290
See application file for complete search history.

(56) References Cited

U.S. PATENT DOCUMENTS

| 4,225,931 A | | 9/1980 | Schwefel |
| 4,462,083 A | * | 7/1984 | Schwefel ..................... 702/94 |
| 4,630,928 A | * | 12/1986 | Klingler et al. ............. 356/619 |
| 5,066,953 A | * | 11/1991 | Lengenfelder et al. ...... 341/155 |
| 5,594,241 A | | 1/1997 | Li et al. |

(Continued)

FOREIGN PATENT DOCUMENTS

DE    27 29 697 A1    1/1979

*Primary Examiner*—Hoa Q. Pham
(74) *Attorney, Agent, or Firm*—Brinks Hofer Gilson & Lione

(57) ABSTRACT

A method for position determination that includes generating first and second position-dependent scanning signals, transmitting the first and second position-dependent scanning signals from a scanning location via corresponding first and second scanning channels to corresponding first and second storage elements, storing corresponding first and second instantaneous values present at the first and second storage elements at corresponding first and second storage times. Forming a measured position value from the first stored instantaneous value and the second stored instantaneous value. A difference exists between corresponding first and second transit times of the first and second position-dependent scanning signals in the corresponding first and second scanning channels, the difference is compensated by individually delaying the first and second position-dependent scanning signals, so that the stored first and second instantaneous values have appeared at a common time at the scanning location.

23 Claims, 4 Drawing Sheets

U.S. PATENT DOCUMENTS 5,956,659 A * 9/1999 Spies et al. .................... 702/94
6,265,992 B1 * 7/2001 Hagl et al. .................... 341/11
6,806,461 B1 * 10/2004 Strasser ................. 250/231.16
2004/0026603 A1 * 2/2004 Burgschat et al. ....... 250/208.1

* cited by examiner

METHOD FOR DETERMINING A POSITION AND POSITION MEASUREMENT DEVICE FOR CARRYING OUT THE METHOD

Applicants claim, under 35 U.S.C. §§ 120 and 365, the benefit of priority of the filing date of Oct. 13, 2001 of a Patent Cooperation Treaty patent application, copy attached, Serial Number PCT/EP01/11860, filed on the aforementioned date, the entire contents of which are incorporated herein by reference, wherein Patent Cooperation Treaty patent application Serial Number PCT/EP01/11860 was not published under PCT Article 21(2) in English.

Applicants claim, under 35 U.S.C. § 119, the benefit of priority of the filing date of Oct. 31, 2000 of a German patent application, copy attached, Serial Number 100 54 075.9, filed on the aforementioned date, the entire contents of which are incorporated herein by reference.

BACKGROUND OF THE INVENTION

1. Field of the Invention

The present invention relates to a method for position determination as well as a position measuring device for executing the method.

2. Description of the Related Art

Incremental position measuring methods and position measuring devices are employed for the highly accurate measurement of the position of moved objects on machinery, such as machine tools or wafer steppers, for example. In the course of this, the position measuring device must measure the position of the object at strictly defined times, and the position must be supplied to the electronic control device which controls the movement of the object. The times are defined by the external electronic control device. So that a position value can be made available at these times, the position measuring device determines position measuring values in a predetermined time grid or on the basis of an external signal by interpolation of several scanning signals of the same frequency, which are offset with respect to each other.

In accordance with DE 27 29 697 A1, memory devices in the form of sample and holding circuits are arranged upstream of the interpolation unit, by which the instantaneous values of all scanning signals are simultaneously stored at the preset times. Position measuring values are formed in the interpolation unit from these instantaneous values. As expressly mentioned in DE 27 29 697 A1, this method is particularly suited to the measurement of moved objects.

It is disadvantageous here that the scanning signals in the individual scanning channels are affected by the signal generation—i.e. from the scanning location—up to the memory devices by different transit delays, which results in measurement errors in the interpolation.

SUMMARY AND OBJECTS OF THE INVENTION

It is therefore an object of the present invention to remove this disadvantage and in this way to increase the accuracy of the measurements.

This object is attained by a method for position determination that includes generating a first position-dependent scanning signal and a second position-dependent scanning signal, transmitting the first position-dependent scanning signal from a scanning location via a first scanning channel to a first storage element, storing a first instantaneous value present at the first storage elements at a first storage time. Transmitting the second position-dependent scanning signal from the scanning location via a second scanning channel to a second storage element and storing a second instantaneous value present at the second storage elements at a second storage time and forming a measured position value from the first stored instantaneous value and the second stored instantaneous value. The method further involves having either 1) a first transit time of the first position-dependent scanning signal in the first scanning channel differing from a second transit time of the second position-dependent scanning signal in the second scanning channel, and the storing of said first instantaneous value and the storing of said second instantaneous value each takes place at times matched to the first and second transit times, respectively, so that each of the stored first and second instantaneous values are instantaneous values which have appeared at a common time at the scanning location; or 2) a difference exists between a first transit time of the first position-dependent scanning signal in the first scanning channel and a second transit time of the second position-dependent scanning signal in the second scanning channel, the difference is compensated by individually delaying the first and second position-dependent scanning signals, so that the stored first and second instantaneous values have appeared at a common time at the scanning location.

This object is also attained by a position measuring device that includes a scanning location that generates a first position-dependent scanning signal and a second position-dependent scanning signal and a first scanning channel that transmits the first position-dependent scanning signal from the scanning location to a first storage element, wherein the first scanning channel and the first storage element are assigned to the first position-dependent scanning signal. A second scanning channel that transmits the second position-dependent scanning signal from the scanning location to a second storage element, wherein the second scanning channel and the second storage element are assigned to the second position-dependent scanning signal. An evaluating unit that forms a measured position value from a first instantaneous value of the first position-dependent scanning signal retrieved from the first storage element and a second instantaneous value of the second position-dependent scanning signal retrieved from the second storage element. The position measuring device further involves having either 1) a first delay member and a second delay member that cause storage of first and second instantaneous values of the first and second position-dependent scanning signals, respectively, for compensating different transit times of the first and second position-dependent scanning signals in the first and second scanning channels, respectively, at different times, so that the first and second stored instantaneous values had appeared at a common time at the scanning location; or 2) a first delay member and a second delay member that individually affect transit times of the first and second position-dependent scanning signals in the first and second scanning channels, respectively, so that the stored first and second instantaneous values have appeared at a common time at the scanning location.

The present invention will be explained in greater detail by exemplary embodiments and with the aid of the drawings.

DESCRIPTION OF THE PREFERRED EMBODIMENT(S) OF THE INVENTION

Figure 1:
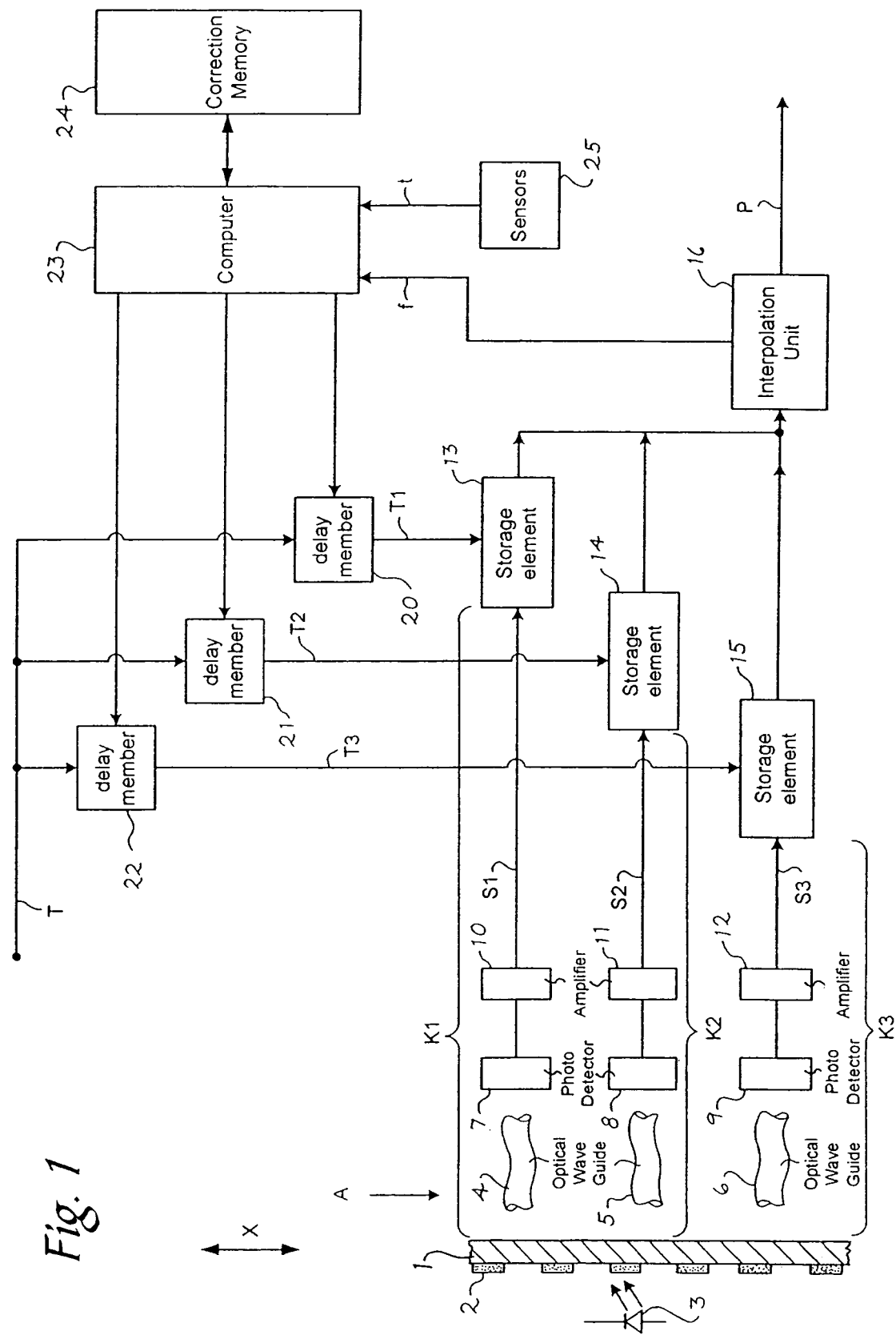
FIG. 1 schematically shows a first embodiment of a position measuring device in accordance with the present invention.

A first embodiment of the present invention will be explained by FIGS. 1 to 5. A photoelectric incremental position measuring device is schematically represented in FIG. 1. In a known manner it includes a scale 1, which can be moved in the measuring direction X and has a periodic graduation 2. The graduation 2 is illuminated by a light source 3, and the light beam is modulated by the graduation 2 as a function of the instantaneous position of the scale 1. Three optical scanning signals, which are offset with respect to each other by 120°, are generated. Each one of the scanning signals is conducted from the scanning location A to photo-detectors 7, 8, 9 via optical wave guides 4, 5, 6 and is converted there into electrical scanning signals S1, S2, S3. The electrical scanning signals S1, S2, S3 are conducted to amplifiers 10, 11, 12 and finally reach storage elements 13, 14, 15, in each of which an instantaneous value of the scanning signals S1, S2, S3 is stored by a storage command T. The stored instantaneous values are conducted to an interpolation unit 16, in which a measured position value P is formed, which defines the absolute position of the graduation 2 within a graduation period or a fraction of a graduation period. The measured position value P is made available to an evaluation unit, not represented, integrated into the position measuring device, or to an external evaluation unit, where it is combined with a counter setting, which defines the graduation periods or fractions of the graduation periods.

The transmission distance from the scanning location A, i.e. starting from the generation of the optical scanning signals, up to the storage elements 13, 14, 15 will be called scanning channel K1, K2, K3 in what follows. Each scanning channel K1, K2, K3 contains components which affect the transit time of the scanning signals S1, S2, S3. In the example, these components include respective optical wave guides 4, 5, 6, photo-detectors 7, 8, 9, as well as amplifiers 10, 11, 12, and electrical conductors. The sums of the optical. and electrical transit times are different in the individual scanning channels K1, K2, K3. This results from differing conductor lengths and component scattering.

In accordance with the first embodiment of the present invention, the different transit times of the scanning signals S1, S2, S3 in the individual scanning channels K1, K2, K3 are compensated in that the storing of instantaneous values of the scanning signals S1, S2, S3 takes place in a manner where they are adapted to the different transit times. The storage of at least one of the scanning signals S1, S2, S3 is delayed by an adjustable amount of time with respect to one of the further scanning signals S1, S2, S3. It is assured by this that all stored instantaneous values of the scanning signals S1, S2, S3 are scanning signals S1, S2, S3 which appear simultaneously at the scanning location A. It is thus possible to set the time delay between the appearance of the instantaneous values at the scanning location A and the storing in the storage elements 13, 14, 15 to a constant value for all scanning channels K1, K2, K3. In this case this time offset can be taken into account and compensated in the subsequent calculations by interpolation or extrapolation methods of positional values.

Delay members 20, 21, 22 in the form of digitally adjustable delay lines are provided for the individual delay of the common storage command T, so that the common storage command T is sent individually matched and delayed to the storage elements 13, 14, 15 as storage commands T1, T2, T3.

It is important here that the delay members 20, 21, 22 are adjusted in such a way that all stored instantaneous values of the scanning signals S1, S2, S3 are the result of instantaneous values which occurred at the same time at the scanning location A. Thus, for all scanning channels K1, K2, K3 the interpolation unit 16 sees a constant delay between the common storage command T and the appearance of the instantaneous values of all scanning signals S1, S2, S3 at the scanning location A. Differing delays in the transmission of the storage command T, or of the commands T1, T2, T3, are also taken into consideration and evened out by the steps in accordance with the present invention.

The delay by the delay members 20, 21, 22 can be adjusted in such a way that no time offset results between the appearance of the storage command T and the appearance of the instantaneous values of the stored scanning signals S1, S2, S3 at the scanning location A. In this case the transit time of each one of the scanning signals S1, S2, S3, starting at the scanning location A, to the storage elements 13, 14, 15—i.e. in the scanning channels K1, K2, K3—exactly corresponds to the set delay time of the common storage command in the respective delay members 20, 21, 22.

The storage elements 13, 14, 15 can be analog-digital converters, which receive the instantaneously present analog value of the scanning signals S1, S2, S3 at the time of the storage commands T1, T2, T3 and change them A/D. However, the storage elements 13, 14, 15 can also be sample-and-hold elements, which store the instantaneous value of the scanning signals S1, S2, S3 at the time of the storage commands T1, T2, T3 and make it available to the interpolation unit 16. The storage elements 13, 14, 15 can be arranged at any arbitrary location in the scanning channels K1, K2, K3, in this case the delay members 20, 21, 22 assigned to them must compensate the transit time difference of the individual scanning signals S1, S2, S3 occurring between the scanning location A and the storage elements 13, 14, 15.

The interpolation unit 16 divides a signal period of the scanning signals S1, S2, S3 into smaller steps. This division takes place on the basis of analog or digital instantaneous values of the scanning signals S1, S2, S3, which are phase-shifted in relation to each other. For this purpose, commercially available interpolation units 16 employ sinusoidal scanning signals S1, S2, S3, which are phase-shifted by 90° in relation to each other. It is therefore advantageous to convert the three scanning signals, phase-shifted by 120° in relation to each other, into two scanning signals, phase-shifted by 90° in relation to each other, prior to the interpolation, and to supply them in a known manner to an analog- or digitally-operating interpolation unit 16 with a bleeder chain, which may be an arrangement of resistors, an arctan computer or a table interpolation.

Figure 2:
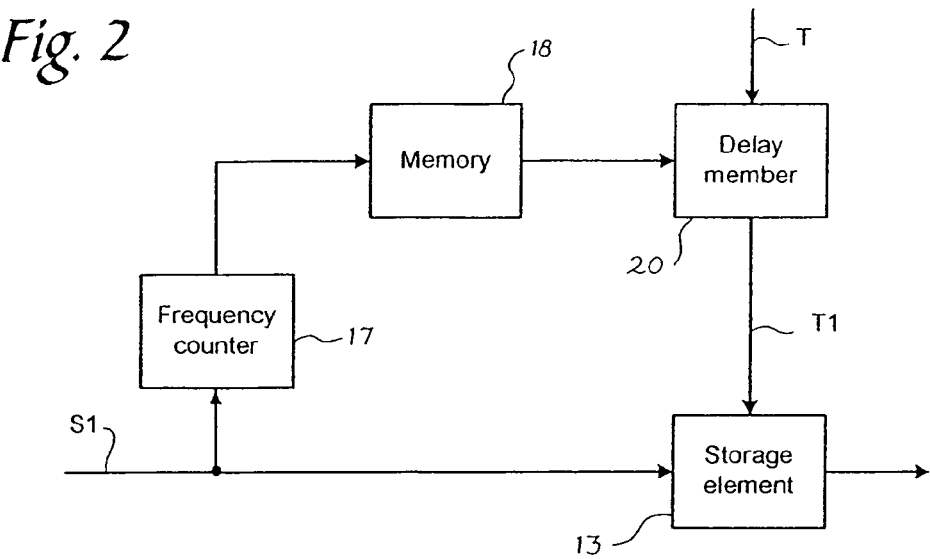
FIG. 2 schematically shows an embodiment of a circuit arrangement for a frequency-dependent delay of a stored command in accordance with the present invention.

No heat sources should be arranged at the measuring location if there are high demands made on measuring accuracy, for example in connection with wafer steppers. For this reason the active components, such as the light source 3, the photo-detectors 7, 8, 9, and the amplifiers 10, 11, 12 are arranged remote from the measuring location. The light is transmitted via optical wave guides 4, 5, 6, some of which are schematically indicated in FIG. 1 or FIG. 2. However, the measuring accuracy is improved by the present invention even without optical wave guides 4, 5, 6, since the photo-detectors 7, 8, 9 and further electrical components 10, 11, 12 affect the transit time of the scanning signals S1, S2, S3.

The present invention can be particularly advantageously employed in photoelectric position measuring devices having an optically scannable scale 1, but can also be used with interferometers, with magnetically, capacitively, as well as inductively scannable graduations.

The time offset caused by the delay members 20, 21, 22 is determined prior to the measuring operation, for example, and adjusted. This adjustment can be performed with the aid of calibrating measurements and can be adapted during the measuring operation, so that dynamic transit time changes, for example because of the frequency dependence of the amplifiers 10, 11, 12, or temperature drifting, can also be compensated. It is also possible to set the time offset to a desired constant value.

In the example represented, the adjustment of the time delay of the delay members 20, 21, 22 is performed by a computer 23, so that, besides a static equalization of the delay times in a calibration cycle, a dynamic adjustment is also possible. In this case the delay to be set is formed by measured values, which had been previously determined and stored in a correction memory (table) 24, and/or by the known behavior of individual effects, such as the input frequency-dependent transit time of the amplifiers 10, 11, 12.

The dynamic correction is schematically represented in FIG. 1. The frequency f of the scanning signals S1, S2, S3 is determined on the basis of the measured position values P, or on the basis of one of the scanning signals S1, S2, S3, and the delay time of the delay members 20, 21, 22 is set as a function thereof. Moreover, external influences, such as the temperature t, are measured by sensors 25, and the delay time is changed as a function thereof.

Another possibility of the frequency-dependent adaptation of the delay time is represented in FIG. 2 for a scanning channel. Here, the frequency of the scanning signal 1 is determined and, as a function thereof, the delay time of the delay member 20 is dynamically changed. A frequency counter 17, as well as a memory 18, if required, are provided for this, which assigns the delay member a previously determined and stored delay time as a function of the instantaneous frequency of the scanning signal S1.

The delay members 20, 21, 22 are digital or analog elements. In an analog operating mode the memory 18 in FIG. 2 is replaced by a frequency voltage converter.

Figure 3:
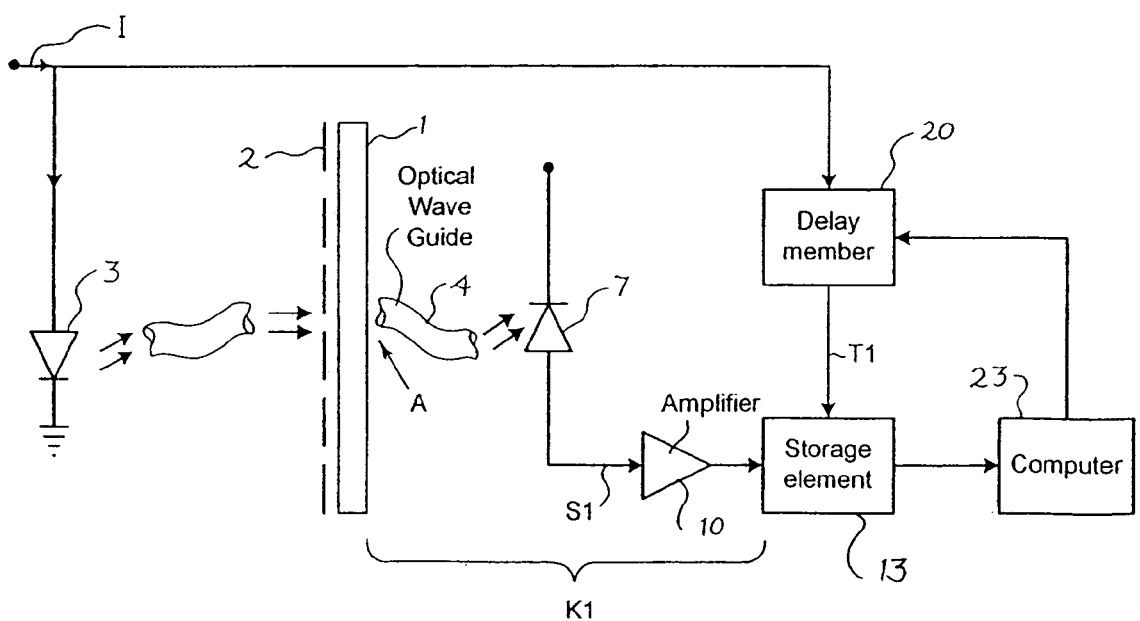
FIG. 3 schematically shows an embodiment of an arrangement for determining a transit time in a scanning channel in accordance with the present invention.

For measuring the actual transit time of a scanning signal S1, S2, S3 in a scanning channel K1, K2, K3, in accordance with FIG. 3 a pulse I is applied at the scanning location A for example by the light source 3 provided, or an additional source. The applied pulse I passes over the same distance as a scanning signal S1, S2, S3, and therefore encounters the same delay times. This exemplary embodiment is represented in FIG. 3 for one of the scanning channels, K1. The pulse I is also used as a storage command TI and there also passes over the same distance as the storage commands T and TI during normal measuring operations as seen in FIG. 1. The necessary delay time can be determined by measuring the time between the storage command TI appearing at the storage element 13 and the scanning signal S1 generated from the impulse I arriving at the storage element 13 through the scanning channel K1 (via elements 7, 10, 13).

By the repeated application of the pulse I and adjustment of the delay time of the delay member 20, the storage of an instantaneous value is displaced in the direction toward the appearance of the pulse I. Thus the delay time is increased until the stored instantaneous value of the scanning signal S1 increases because of the pulse I. Then the storage is adjusted to the ascending flank of the pulse I and the adjusted delay time of the delay member 20 corresponds to the transit time of the pulse I in the scanning channel K1. The delay time can also be increased until the stored instantaneous value is maximal. The determination of the transit time can be performed by calculating the geometric center of gravity of the picked-up pulse I. By this, an averaging of the calibration measurements occurs, and errors in the delay members 20, 21, 22, noise and jittering at the time of scanning are reduced. The transit time between the individual scanning channels K1, K2, K3 can be very accurately set by correlation methods in particular.

Figure 4:
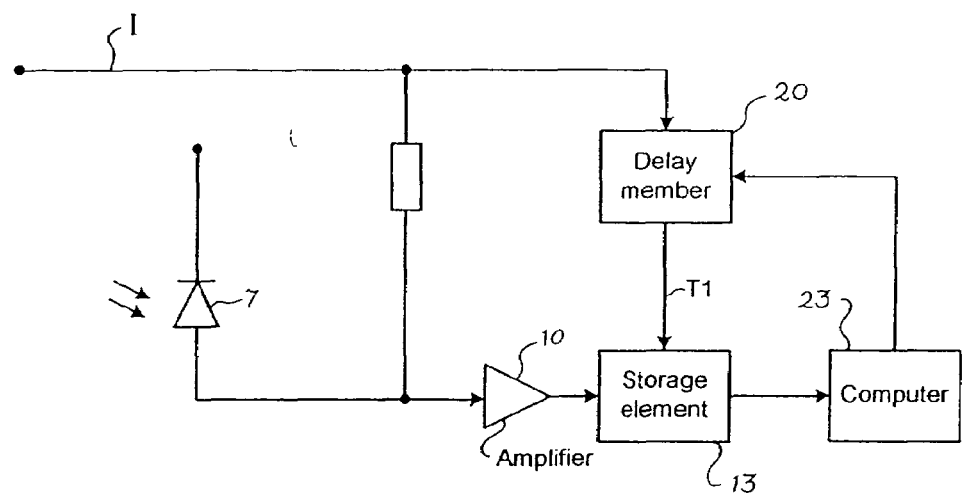
FIG. 4 schematically shows a second arrangement for determining the transit time in accordance with the present invention.

A further possibility of coupling a pulse I into the scanning channel K1 is represented in FIG. 4. The pulse I is fed in parallel with the photo-detector 7.

Figure 5:
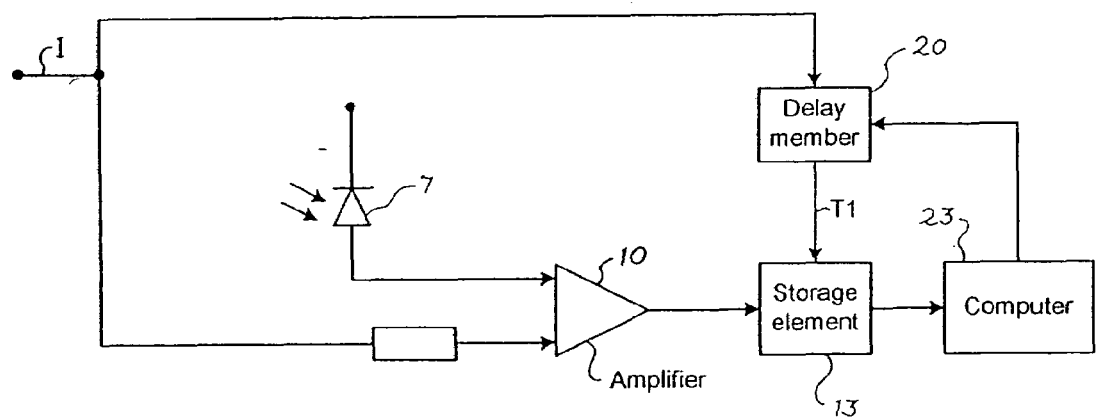
FIG. 5 schematically shows a third embodiment of an arrangement for determining the transit time in accordance with the present invention.

Alternatively to this, in accordance with FIG. 5 the pulse I is applied to a second input of the amplifier 10.

In connection with a position measuring device with a scale, the generation of the pulse can take place by suitable structuring of the scale. In the case of an interferometer, the laser light source can be modulated for generating the pulse I.

Test signals I of different frequencies are fed into a scanning channel K1, K2, K3 for determining frequency-dependent transit times in one of the scanning channels K1, K2, K3. On the basis of the change in the scanning signals S1, S2, S3 present at the storage elements 13, 14, 15, conclusions regarding the frequency-dependent transit times can be drawn.

In summary, the first embodiment of the present invention therefore relates to a method for position determination with the following method steps:

generation of several position-dependent scanning signals (S1, S2, S3), transmission of each one of the scanning signals (S1, S2, S3) from a scanning location (A) via a scanning channel (K1, K2, K3) to a storage element (13, 14, 15), storage of an instantaneous value present at the storage element (13, 14, 15) at a storage time, formation of a measured position value (P) from the stored instantaneous values of the scanning signals (S1, S2, S3), wherein the transit times of the scanning signals (S1, S2, S3) are different in at least two scanning channels (K1, K2, K3), and storage takes place at times matched to the different transit times, so that the stored instantaneous values of the scanning signals (S1, S2, S3) are instantaneous values which have appeared at a common time at the scanning location (A).

In summary, the first embodiment of the present invention also relates to a position measuring device, having a scanning location (A) for the generation of a plurality of position-dependent scanning signals (S1, S2, S3), scanning channels (K1, K2, K3) for transmitting the scanning signals (S1, S2, S3) from the scanning location (A) to storage elements (13, 14, 15), wherein a scanning channel (K1, K2, K3) and a storage element (13, 14, 15) are assigned to each scanning signal (S1, S2, S3), an evaluating unit (16) for forming a measured position value (P) from instantaneous values of the scanning signals (S1, S2, S3) retrieved from the storage elements (13, 14, 15), delay members (20, 21, 22) for causing the storage of instantaneous values of the scanning signals (S1, S2, S3) for compensating different transit times of the scanning signals (S1, S2, S3) in the scanning channels (K1, K2, K3) at different times, so that the stored instantaneous values of the scanning signals (S1, S2, S3) are instantaneous values which had appeared at a common time at the scanning location (A).

The above described first embodiment of the present invention has the advantage that no additional frequency-dependent components are placed into the scanning channels K1, K2, K3, and that the time delay of the storage command T with defined flanks and defined amplitude can be very exactly adjusted.

Figure 6:
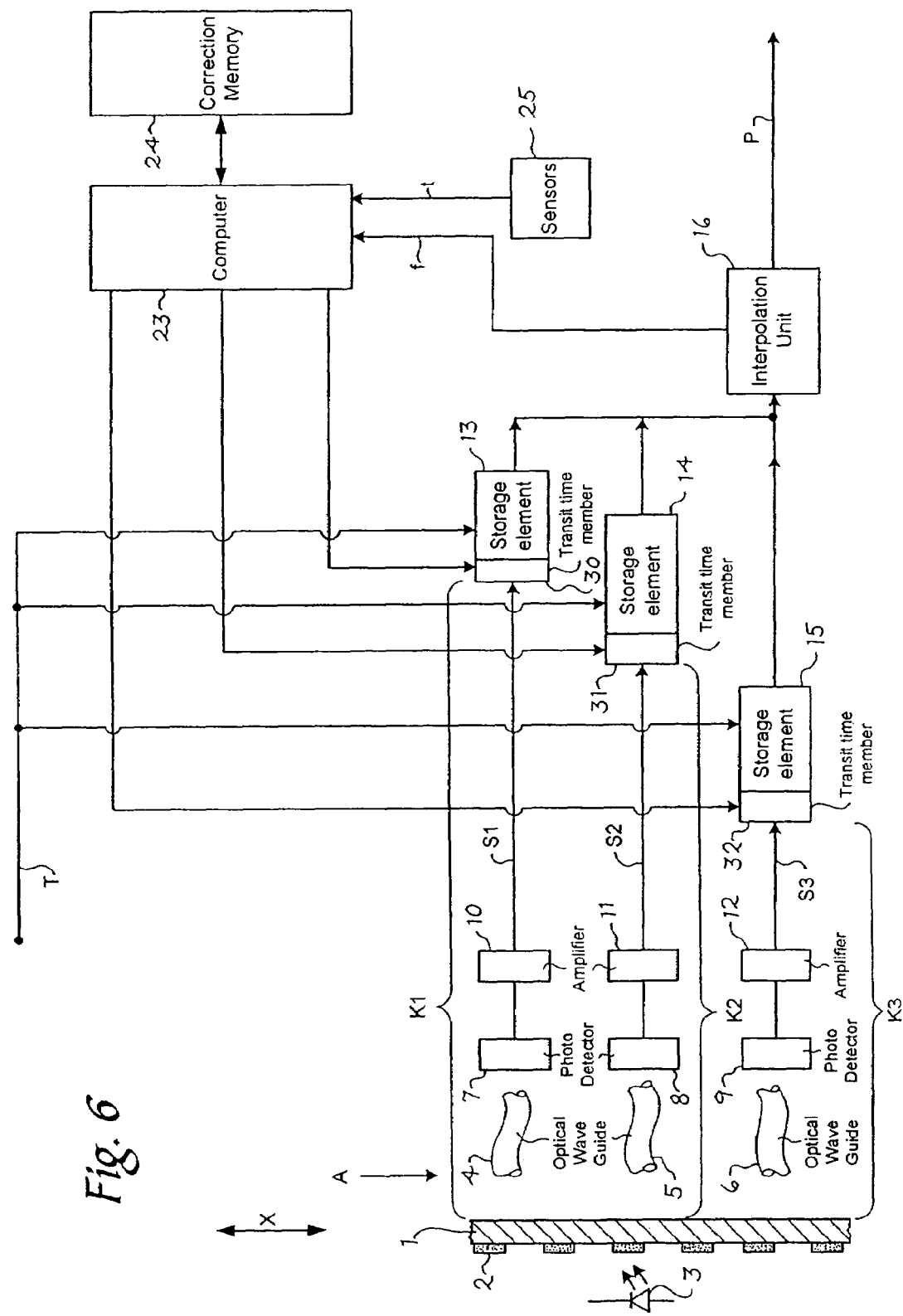
FIG. 6 schematically shows a second embodiment of a position measuring device in accordance with the present invention.

A second exemplary embodiment of a position measuring device will be explained by FIG. 6. The compensation of different transit times in the scanning channels K1, K2, K3 is performed by transit time members 30, 31, 32 inserted into the scanning channels K1, K2, K3. The design largely corresponds to that of the first position measuring device, so that in all examples components having the same effects are provided with the same reference symbols. The transit time of the scanning signals S1, S2, S3 is statically preset or is dynamically set as a function of the instantaneous frequency of at least one of the scanning signals S1, S2, S3, so that all stored instantaneous values of the scanning signals S1, S2, S3 are simultaneously appearing instantaneous values of the scanning signals S1, S2, S3 at the scanning location A. The time delay between the appearance of the instantaneous values at the scanning location A and the storage in the storage elements 13, 14, 15 can therefore be set to a constant value for all scanning channels K1, K2, K3. This time offset can be taken into consideration and compensated in the subsequent calculations by interpolation or extrapolation methods of position values.

In summation, the second embodiment of the present invention therefore relates to a method for position determination with the following method steps:

generation of several position-dependent scanning signals (S1, S2, S3), transmission of each one of the scanning signals (S1, S2, S3) from a scanning location (A) via a scanning channel (K1, K2, K3) to a storage element (13, 14, 15), storage of an instantaneous value present at the storage element (13, 14, 15) at a storage time, formation of a measured position value (P) from the stored instantaneous values of the scanning signals (S1, S2, S3), wherein different transit times of the scanning signals (S1, S2, S3) in the scanning channels (K1, K2, K3) are compensated by the individual delay of the scanning signals (S1, S2, S3), so that the stored instantaneous values of the scanning signals (S1, S2, S3) are instantaneous values which have appeared at a common time at the scanning location (A).

The second embodiment of the present invention in summation also relates to a position measuring device, having a scanning location (A) for the generation of a plurality of position-dependent scanning signals (S1, S2, S3), scanning channels (K1, K2, K3) for transmitting the scanning signals (S1, S2, S3) from the scanning location (A) to storage elements (13, 14, 15), wherein a scanning channel (K1, K2, K3) and a storage element (13, 14, 15) are assigned to each scanning signal (S1, S2, S3), an evaluating unit (16) for forming a measured position value (P) from instantaneous values of the scanning signals (S1, S2, S3) retrieved from the storage elements (13, 14, 15), delay members (20, 21, 22) for individually affecting the transit times of the scanning signals (S1, S2, S3) in the scanning channels (K1, K2, K3), so that the stored instantaneous values of the scanning signals (S1, S2, S3) are instantaneous values which have appeared at a common time at the scanning location (A).

The present invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A method for position determination comprising:

generating a first position-dependent scanning signal and a second position-dependent scanning signal;

transmitting said first position-dependent scanning signal from a scanning location via a first scanning channel to a first storage element;

storing a first instantaneous value present at said first storage elements at a first storage time;

transmitting said second position-dependent scanning signal from said scanning location via a second scanning channel to a second storage element;

storing a second instantaneous value present at said second storage elements at a second storage time;

forming a measured position value from said first stored instantaneous value and said second stored instantaneous value;

wherein a first transit time of said first position-dependent scanning signal in said first scanning channel differs from a second transit time of said second position-dependent scanning signal in said second scanning channel, and said storing of said first instantaneous value and said storing of said second instantaneous value each takes place at times matched to said first and second transit times, respectively, so that each of said stored first and second instantaneous values are instantaneous values which have appeared at a common time at said scanning location.

2. The method in accordance with claim 1, wherein said first and second position-dependent scanning signals are each periodic with a common period, and which are phase-shifted in relation to each other, and said forming said measured position value comprises interpolation.

3. The method in accordance with claim 2, wherein said storing of said first instantaneous value and said storing of said second instantaneous value are each caused by a common storage command, wherein said storage command is provided with a different delay to at least said first and second storage elements.

4. The method in accordance with claim 2, wherein said storing said first instantaneous value and said storing said second instantaneous value are each caused by a common storage command, wherein said storage command is provided with a delay to said first and second storage elements, and said delay time is set to equal said first and second transit times in said first and second scanning channels, respectively.

5. The method in accordance with claim 1, wherein said storing said first instantaneous value and said storing said second instantaneous value are each caused by a common storage command, wherein said storage command is provided with a different delay to at least said first and second storage elements.

6. The method in accordance with claim 5, wherein said delays to said first and second storage elements are each set as a function of an instantaneous frequency of said first and second position-dependent scanning signals.

7. The method in accordance with claim 1, wherein said storing said first instantaneous value and said storing said second instantaneous value are each caused by a common storage command, wherein said storage command is provided with a delay to said first and second storage elements, and said delay time is set to equal said first and second transit times in said first and second scanning channels, respectively.

8. The method in accordance with claim 7, wherein said delays to said first and second storage elements are each set as a function of an instantaneous frequency of said first and second position-dependent scanning signals.

9. A method for position determination comprising:
    generating a first position-dependent scanning signal and a second position-dependent scanning signal;
    transmitting said first position-dependent scanning signal from a scanning location via a first scanning channel to a first storage element;
    storing a first instantaneous value present at said first storage elements at a first storage time;
    transmitting said second position-dependent scanning signal from said scanning location via a second scanning channel to a second storage element;
    storing a second instantaneous value present at said second storage elements at a second storage time;
    forming a measured position value from said first stored instantaneous value and said second stored instantaneous value;
    wherein a difference exists between a first transit time of said first position-dependent scanning signal in said first scanning channel and a second transit time of said second position-dependent scanning signal in said second scanning channel, said difference is compensated by individually providing delays to said first and second position-dependent scanning signals, so that said stored first and second instantaneous values have appeared at a common time at said scanning location.

10. The method in accordance with claim 9, wherein said first and second position-dependent scanning signals are each periodic with a common period, and which are phase-shifted in relation to each other, and said forming said measured position value comprises interpolation.

11. The method in accordance with claim 10, wherein said delays are each set as a function of an instantaneous frequency of said first and second position-dependent scanning signals.

12. The method in accordance with claim 9, wherein said storing said first instantaneous value and said storing said second instantaneous value are each caused by a common storage command.

13. The method in accordance with claim 9, wherein said delays are each set as a function of an instantaneous frequency of said first and second position-dependent scanning signals.

14. A position measuring device, comprising:
    a scanning location that generates a first position-dependent scanning signal and a second position-dependent scanning signal;
    a first scanning channel that transmits said first position-dependent scanning signal from said scanning location to a first storage element, wherein said first scanning channel and said first storage element are assigned to said first position-dependent scanning signal;
    a second scanning channel that transmits said second position-dependent scanning signal from said scanning location to a second storage element, wherein said second scanning channel and said second storage element are assigned to said second position-dependent scanning signal;
    an evaluating unit that forms a measured position value from a first instantaneous value of said first position-dependent scanning signal retrieved from said first storage element and a second instantaneous value of said second position-dependent scanning signal retrieved from said second storage element;
    a delay member that causes, at least in part, storage of said first instantaneous value of said first position-dependent scanning signal for compensating a transit time of said first position-dependent scanning signal in said first scanning channel so that said first and second stored instantaneous values had appeared at a common time at said scanning location.

15. The position measuring device in accordance with claim 14, wherein said first and second position-dependent scanning signals are each periodic with a common period and which are phase-shifted in relation to each other, and said evaluating unit comprises an interpolation unit for dividing said period.

16. The position measuring device in accordance with claim 15, wherein said phase shift is 120° or 90°.

17. The position measuring device in accordance with claim 14, wherein a first storage command is sent to said first storage element and a second storage command is sent to said second storage element, which causes said storage of an existing instantaneous value, and that said first and second storage commands are derived from a common storage command, wherein at least one of said first and second storage commands is said common storage command, which is delayed by said delay member.

18. The position measuring device in accordance with claim 17, wherein a second delay member is assigned to said second storage element for the delay of said common storage command.

19. The position measuring device in accordance with claim 18, wherein first and second delay times of said delay member and said second delay member, respectively, correspond to first and second transit times of said first and second position-dependent scanning signals in said first and second respective scanning channels.

20. A position measuring device, comprising:
    a scanning location that generates a first position-dependent scanning signal and a second position-dependent scanning signal;
    a first scanning channel that transmits said first position-dependent scanning signal from said scanning location to a first storage element, wherein said first scanning channel and said first storage element are assigned to said first position-dependent scanning signal;

a second scanning channel that transmits said second position-dependent scanning signal from said scanning location to a second storage element, wherein said second scanning channel and said second storage element are assigned to said second position-dependent scanning signal;

an evaluating unit that forms a measured position value from first and second instantaneous values of said first position-dependent scanning signal and said second position-dependent scanning signal, respectively, retrieved from said first and second storage elements;

a delay member that affects, at least in part, a transit time of said first position-dependent scanning signal in said first scanning channel so that said stored first and second instantaneous values have appeared at a common time at said scanning location.

21. The position measuring device in accordance with claim 20, wherein said first and second position-dependent scanning signals are each periodic with a common period and which are phase-shifted in relation to each other, and said evaluating unit comprises an interpolation unit for dividing said period.

22. The position measuring device in accordance with claim 21, wherein said phase shift is 120° or 90°.

23. The position measuring device in accordance with claim 21, wherein a second delay member is assigned to said second storage element.

* * * * *